(12) United States Patent
Korenaga et al.

(10) Patent No.: US 9,701,203 B2
(45) Date of Patent: Jul. 11, 2017

(54) ON-BOARD UNIT AND ELECTRIC VEHICLE MANAGEMENT SYSTEM

(71) Applicant: MITSUBISHI HEAVY INDUSTRIES, LTD., Tokyo (JP)

(72) Inventors: Takeshi Korenaga, Tokyo (JP); Hisaji Takeuchi, Tokyo (JP); Ryota Hiura, Tokyo (JP); Tomohiro Murata, Tokyo (JP); Takeshi Nagata, Tokyo (JP); Hiromichi Nakamoto, Tokyo (JP); Seiki Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 24 days.

(21) Appl. No.: 14/769,958

(22) PCT Filed: Feb. 25, 2014

(86) PCT No.: PCT/JP2014/054456
§ 371 (c)(1),
(2) Date: Aug. 24, 2015

(87) PCT Pub. No.: WO2014/132946
PCT Pub. Date: Sep. 4, 2014

(65) Prior Publication Data
US 2016/0001656 A1    Jan. 7, 2016

(30) Foreign Application Priority Data
Feb. 26, 2013    (JP) .................................. 2013-036242

(51) Int. Cl.
*B60L 3/00*    (2006.01)
*B60L 11/18*    (2006.01)
(Continued)

(52) U.S. Cl.
CPC ................ *B60L 3/00* (2013.01); *B60K 35/00* (2013.01); *B60L 11/18* (2013.01);
(Continued)

(58) Field of Classification Search
CPC ........ B60L 3/00; B60L 11/18; B60L 11/1816; B60L 11/1846; B60L 11/1848;
(Continued)

(56) References Cited

U.S. PATENT DOCUMENTS 8,538,621 B2 *  9/2013  Ross .................... B60L 11/1816
                                                    340/455
8,718,844 B2 *  5/2014  Krause .................. B60W 50/14
                                                    180/65.29
(Continued)

FOREIGN PATENT DOCUMENTS

JP    2003-262525 A    9/2003
JP    2007-148590 A    6/2007
(Continued)

OTHER PUBLICATIONS

PCT/IB/338, "Notification of Transmittal of Translation of the International Preliminary Report on Patentability for International Application No. PCT/JP2014/054456," Sep. 11, 2015.

(Continued)

*Primary Examiner* — Tuan C. To
(74) *Attorney, Agent, or Firm* — Manabu Kanesaka; Benjamin Hauptman; Kenneth Berner

(57) ABSTRACT

An electric vehicle management system which controls a charging amount for an electric vehicle by way of peak shift, and an on-board unit used for the electric vehicle management system are provided. Thereby, the on-board unit mounted on the electric vehicle detects a current location, and an electric vehicle management center provided on a network manages a charging schedule created in advance.

(Continued)

Propriety of a charging operation at a current time is checked via communications between them. Charging of the electric vehicle is managed based on the charging schedule by notifying a driver of the check result through a display of the on-board unit.

16 Claims, 9 Drawing Sheets

(51) Int. Cl.
- *B60K 35/00* (2006.01)
- *H01M 10/42* (2006.01)
- *H01M 10/44* (2006.01)
- *G01S 19/13* (2010.01)
- *G01S 5/00* (2006.01)

(52) U.S. Cl.
CPC ....... *B60L 11/1816* (2013.01); *B60L 11/1846* (2013.01); *B60L 11/1848* (2013.01); *B60L 11/1861* (2013.01); *G01S 5/0027* (2013.01); *G01S 19/13* (2013.01); *H01M 10/4207* (2013.01); *H01M 10/441* (2013.01); *B60K 2350/1076* (2013.01); *B60L 2240/12* (2013.01); *B60L 2240/622* (2013.01); *B60L 2240/72* (2013.01); *B60L 2240/80* (2013.01); *B60L 2250/16* (2013.01); *B60L 2260/44* (2013.01); *H01M 2220/20* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(58) Field of Classification Search
CPC .............. B60L 11/1861; B60L 2240/12; B60L 2240/622; B60L 2240/72; B60L 2240/80; B60L 2250/16; B60L 2260/44; B60K 35/00; B60K 2350/1076; G01S 5/0027; G01S 19/13; H01M 10/4207; H01M 10/441; H01M 2220/20; Y02T 10/7005; Y02T 10/705; Y02T 10/7072; Y02T 10/7291; Y02T 90/121; Y02T 90/128; Y02T 90/14; Y02T 90/16; Y02T 90/162; Y02T 90/163; Y02T 90/169; Y04S 30/14
See application file for complete search history.

(56) References Cited

U.S. PATENT DOCUMENTS

| | | | | |
|---|---|---|---|---|
| 9,024,571 B2* | 5/2015 | Uyeki | ................... | B60L 11/184 320/101 |
| 9,225,171 B2* | 12/2015 | Chen | ................... | B60L 11/1816 |
| 9,348,381 B2* | 5/2016 | Khoo | ................... | B60L 11/1825 |
| 2009/0240590 A1* | 9/2009 | Or | ........................ | G06Q 30/02 705/14.58 |
| 2011/0202221 A1* | 8/2011 | Sobue | ................... | B60K 16/00 701/22 |
| 2012/0065831 A1* | 3/2012 | Ross | ................... | B60L 11/1816 701/29.1 |
| 2012/0233077 A1* | 9/2012 | Tate, Jr. | ................ | B60L 11/1816 705/65 |
| 2013/0093393 A1* | 4/2013 | Shimotani | ................. | B60L 3/12 320/109 |
| 2013/0110632 A1* | 5/2013 | Theurer | ................ | G06F 3/0481 705/14.58 |
| 2013/0162025 A1 | 6/2013 | Momose et al. | | |
| 2013/0179057 A1* | 7/2013 | Fisher | ................. | B60L 11/1861 701/117 |
| 2013/0181672 A1* | 7/2013 | Egoshi | ................... | G06Q 10/02 320/109 |
| 2013/0184882 A1 | 7/2013 | Momose et al. | | |
| 2013/0201316 A1* | 8/2013 | Binder | ................... | H04L 67/12 348/77 |
| 2013/0282718 A1 | 10/2013 | Sagata | | |
| 2013/0285608 A1* | 10/2013 | Jikihara | ............. | B60L 11/1857 320/109 |
| 2014/0005847 A1* | 1/2014 | Melen | ....................... | G06F 1/28 700/291 |
| 2014/0025220 A1* | 1/2014 | Carlson | ............. | H01L 31/02021 700/296 |
| 2015/0032315 A1* | 1/2015 | Kinomura | ............. | H02J 7/0004 701/22 |

FOREIGN PATENT DOCUMENTS

| | | | | |
|---|---|---|---|---|
| JP | 2007-282383 A | 10/2007 | | |
| JP | 2010-081722 A | 4/2010 | | |
| JP | 2010-267110 A | 11/2010 | | |
| JP | 2011-15521 A | 1/2011 | | |
| JP | 2011015521 A | * | 1/2011 | |
| JP | 2011-102739 A | 5/2011 | | |
| JP | 2011-203174 A | 10/2011 | | |
| JP | 2011253257 A | * | 12/2011 | ................ B60L 3/12 |
| JP | 2012-64114 A | 3/2012 | | |
| JP | 2012-113546 A | 6/2012 | | |
| JP | 2012160022 A | * | 8/2012 | |
| JP | 2012-213316 A | 11/2012 | | |
| JP | 2012-228170 A | 11/2012 | | |
| JP | 2013-38909 A | 2/2013 | | |
| JP | 2013-65265 A | 4/2013 | | |
| WO | 2012/017936 A1 | 2/2012 | | |
| WO | 2012/017937 A1 | 2/2012 | | |
| WO | 2012/095941 A1 | 7/2012 | | |

OTHER PUBLICATIONS

PCT/IB/373, "International Preliminary Report on Patentability for International Application No. PCT/JP2014/054456," Sep. 1, 2015.
PCT/ISA/237, "Written Opinion of the International Searching Authority for International Application No. PCT/JP2014/054456," May 13, 2014.
PCT/IB/326, "Notification Concerning Transmittal of International Preliminary Report on Patentability for International Application No. PCT/JP2014/054456," Sep. 11, 2015.
PCT, "International Search Report for International Application No. PCT/JP2014/054456," May 13, 2014.
Japan Patent Office, "Office Action for Japanese Patent Application No. 2013-036242," Nov. 1, 2016.

* cited by examiner

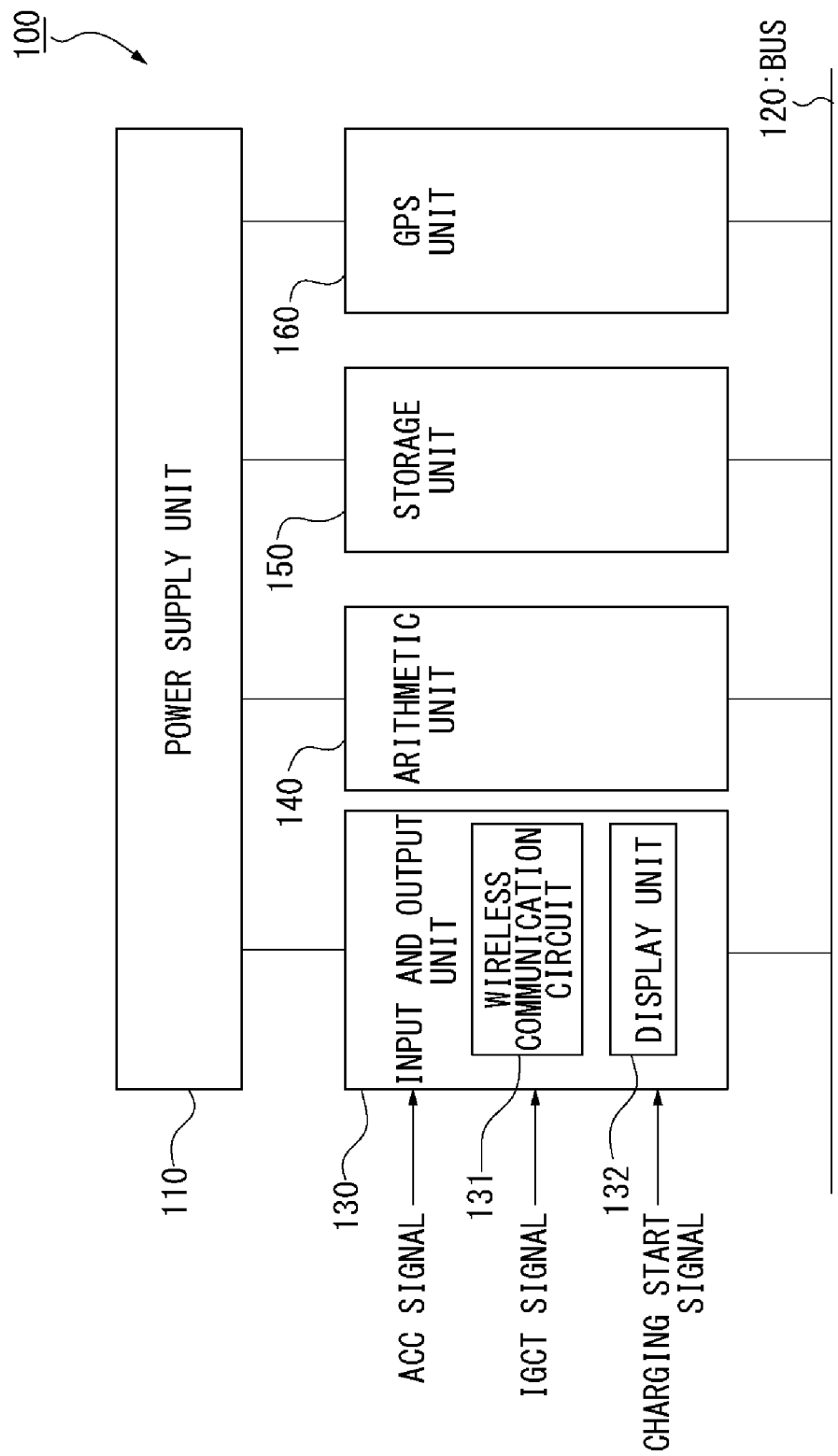

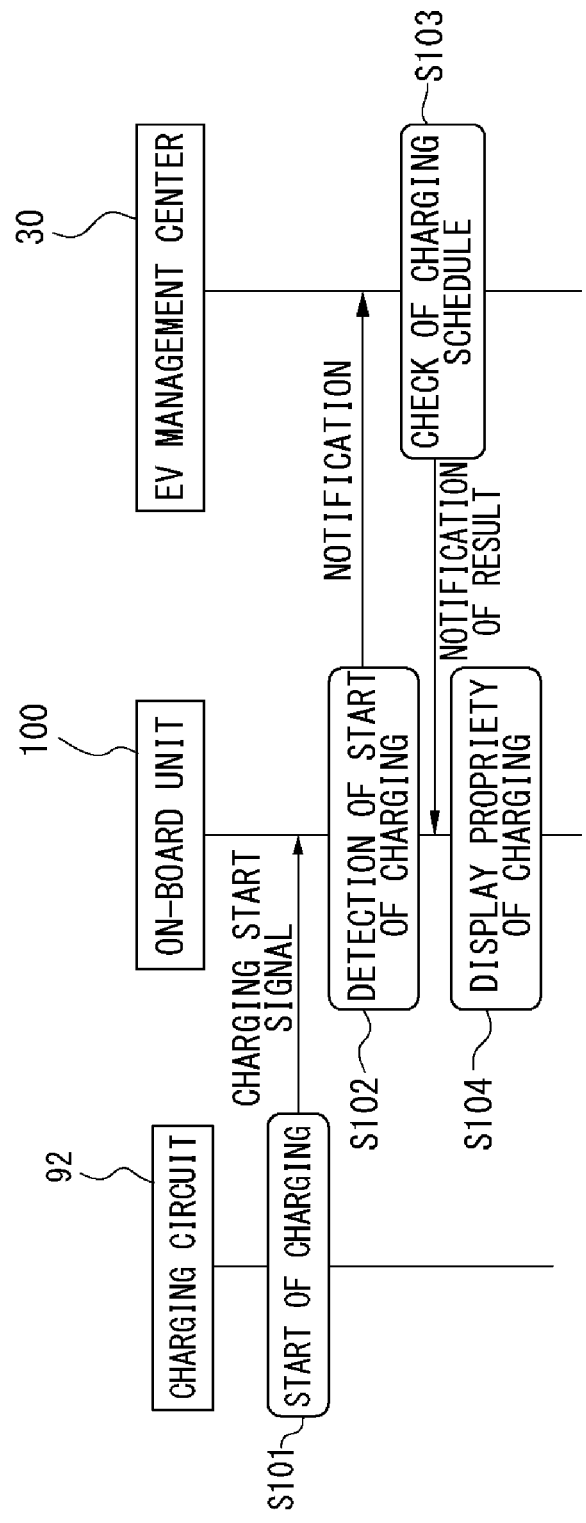

ON-BOARD UNIT AND ELECTRIC VEHICLE MANAGEMENT SYSTEM

TECHNICAL FIELD

The present invention relates to an EV (Electric Vehicle) management system and an on-board unit used for this EV management system. The present invention is used for, preferably, the EV management system in a smart community in which electric power consumption of the whole community is managed, and the on-board unit used for this EV management system.

BACKGROUND ART

In the so-called smart community and so on, it is expected to establish a low-carbon society by letting an EV which travels mainly using an externally rechargeable battery as a power source have a central role in transportation means.

In such a smart community, electric power required for an operation of the EV is intensively consumed during EV charging using charging equipment of each home or a dedicated charging facility. If life patterns are similar among most of inhabitants, it is expected that many EVs are charged at the same time. So, it is necessary to manage a charging amount from the EV charging facility by an EV management center and so on so that the electric power consumption of the whole community does not exceeds suppliable electric power even in an electric power consumption peak. Note that a specific method for shifting a part of the electric power consumption for the EV charging from a peak time zone to another time zone, including a method which is particularly called as peak-cut, peak shift and so on, is required.

In connection with the above, Patent Literature 1 (JP 2007-282383 A) discloses a method and system for leveling electric power load. In the method and system for leveling electric power load described in Patent Literature 1, leveling of the electric power load is realized at low costs by using a battery of car such as an electric vehicle, which is used as a commuter vehicle and is not used during an electric power demand peak in the daytime.

Patent Literature 2 (JP-2011-15521 A) discloses a system and method for charge control of electric vehicle, server, and smart meter. In the system and method for charge control of electric vehicle, the server, and the smart meter described in Patent Literature 2, charging costs for the electric vehicle are reduced by considering electric rates corresponding to various time zones.

Patent Literature 3 (WO 2012/017936 A1) discloses a battery information output device for power supply/demand leveling system. In the battery information output device for power supply/demand leveling system described in Patent Literature 3, in order to perform the peak cut of electric power, a battery of the electric vehicle, which is not operated in the daytime, is effectively used by appropriately discharging the battery based on an operation plan.

Patent Literature 4 (WO 2012/017937 A1) discloses a power demand-and-supply equalization system is disclosed. In the power demand-and-supply equalization system described in Patent Literature 4, in order to perform the peak cut of electric power, a battery of the electric vehicle, which is not operated in the daytime, is effectively used by appropriately discharging the battery based on an operation plan.

Patent Literature 5 (JP 2012-213316 A) discloses a system and method for optimal load planning of electric vehicle charging. In the system and method for optimal load planning of electric vehicle charging described in Patent Literature 5, the system for planning an electric vehicle charging plan for optimal planning of electric power demand is provided.

Patent Literature 6 (JP 2012-228170 A) discloses an integrated electric meter and an electric vehicle charging station. In the integrated electric meter and the electric vehicle charging station described in Patent Literature 6, charging equipment, metering equipment and communication equipment required for charging the electric vehicle is integrally stored in an enclosure, and simplified electric vehicle charging station is provided.

CITATION LIST

Patent Literature

Patent Literature 1: Japan Patent Application Publication JP 2007-282383 A
Patent Literature 2: Japan Patent Application Publication JP 2011-15521 A
Patent Literature 3: International Patent Application Publication WO 2012/017936 A1
Patent Literature 4: International Patent Application Publication WO 2012/017937 A1
Patent Literature 5: Japan Patent Application Publication JP 2012-213316 A
Patent Literature 6: Japan Patent Application Publication JP 2012-228170 A

SUMMARY OF THE INVENTION

An object of the present invention is providing an EV management system for appropriately controlling a charging amount of an electric vehicle and providing an on-board unit used for the EV management system. Other objects and original technical features will be revealed from description of this specification and attached drawings.

According to an embodiment, the on-board unit mounted on the electric vehicle detects a current location, an electric vehicle management center provided on a network manages a charging schedule created in advance, it is possible to check whether or not an charging operation is allowed at the current time zone by their communications, and a result of the check is notified a driver from a display unit of the on-board unit.

According to the above-mentioned embodiment, it is possible to manage the EV charging based on the charging schedule.

BRIEF DESCRIPTION OF THE DRAWINGS

FIG. 4A is a block diagram for indicating a configuration example of an on-board unit according to a first embodiment;

FIG. 4B is a sequential diagram for indicating an operational example of the EV management system according to the first embodiment;

DESCRIPTION OF EMBODIMENTS

With reference to the attached drawings, an electric vehicle management system and an on-board unit according to some embodiments will be explained.

First Embodiment

Figure 1:
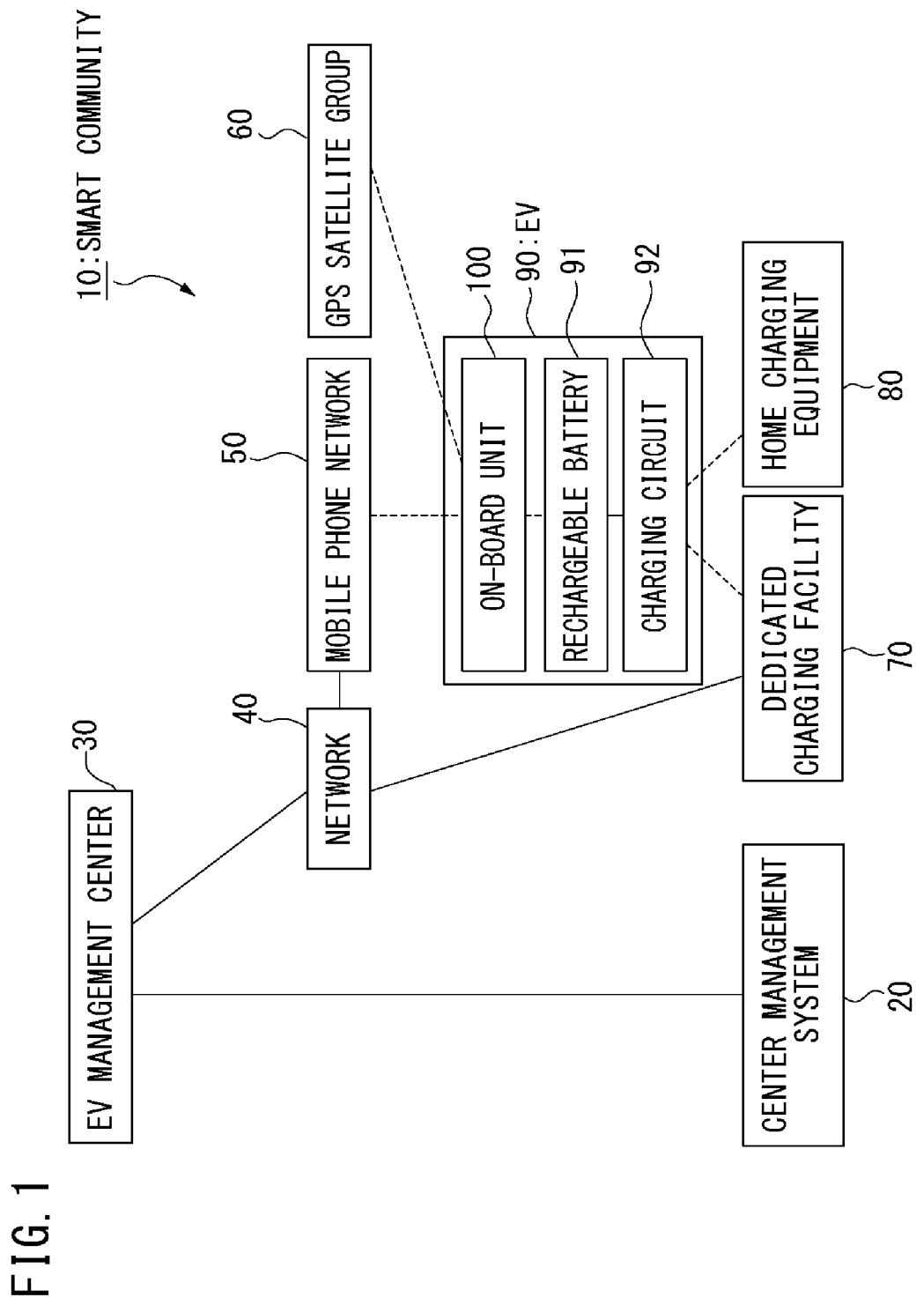
FIG. 1 is a block diagram for indicating an entire configuration of an EV management system.

FIG. 1 is the block diagram for indicating the entire configuration of the EV management system. Components indicated in FIG. 1 will be explained.

The EV management system shown in FIG. 1 includes, a center management system 20, an EV management center 30 which also functions as a server, a network 40, a mobile phone network 50 as a wireless communication network, GPS (Global Positioning System) satellite group 60, a dedicated charging facility 70, a home charging equipment 80, and an electric vehicle 90. The EV 90 includes a rechargeable battery 91, a charging circuit 92, and an on-board unit 100. Note that a part of the components shown in FIG. 1 or all of the components shown in FIG. 1 is included a given smart community 10. In addition, the center management system 20 may be a CEMS (Community Energy Management System) which performs overall energy management in the smart community 10.

Connection relationships of the components of the EV management system shown in FIG. 1 will be explained. The center management system 20 is connected to the EV management center 30. The EV management center 30 is connected to the center management system 20 and the network 40. The network 40 is connected to the EV management center 30, the mobile phone network 50 and the dedicated charging facility 70. The mobile phone network 50 can be connected to the on-board unit 100 of the EV 90 via wireless communication. The GPS satellite group 60 transmits a wireless communication signal for measuring a location to the on-board unit 100 of the EV 90. The dedicated charging facility 70 is connected to the network 40, and is connectable to the charging circuit 92 of the EV 90 via a charging plug and so on. The home charging equipment 80 is connectable to the charging circuit 92 of the EV 90 via a charging plug and so on. The charging circuit 92 of the EV 90 is connected to the rechargeable battery 91, and is connectable to the dedicated charging facility 70 and the home charging equipment 80 via the charging plug and so on. The on-board unit 100 of EV 90 is connectable to the mobile phone network 50 and the GPS satellite group 60 via the wireless communication.

Operations of the components of the EV management system shown in FIG. 1 will be explained. The center management system 20 manages the entire smart community 10, in particular, manages an amount of electric power available in the smart community 10 for each time zone. More specifically, the center management system 20 manages time distribution of the amount of electric power available for charging the rechargeable batteries 91 of an EV 90 group in the smart community 10. The EV management center 30 manages a charging schedule of all the electric vehicles 90 which are registered in the smart community 10 so as to be consistent with the time distribution of the amount of electric power available for charging the EVs managed by the center management system 20. The dedicated charging facility 70 is under management of the EV management center 30 via the network 40, and in principle, the dedicated charging facility 70 supplies electric power for charging to the rechargeable battery 91 of the EV 90 within a range allowed by the charging schedule. The home charging equipment 80 is not managed by the EV management center 30, and in principle, the home charging equipment 80 can supply the electric power for charging to the rechargeable battery 91 of the EV 90 through the charging circuit 92 regardless of the charging schedule. The charging circuit 92 converts a voltage, current, waveform etc. of the electric power supplied from the dedicated charging facility 70 or the home charging equipment 80, and charges the rechargeable battery 91 after the conversion. The rechargeable battery 91 is charged by the electric power supplied from the charging circuit 92, and also supplies the charged electric power to the EV 90. The on-board unit 100 detects the current location of the EV 90 by receiving the wireless communication signal from the GPS satellite group 60, and communicates with the EV management center 30 via the mobile phone network 50 and the network 40. In addition, the on-board unit 100 has a function of displaying to a user of the EV 90 whether or not charge is allowed and notifying the user of it when it has been confirmed whether or not the charge is allowed.

Figure 2:
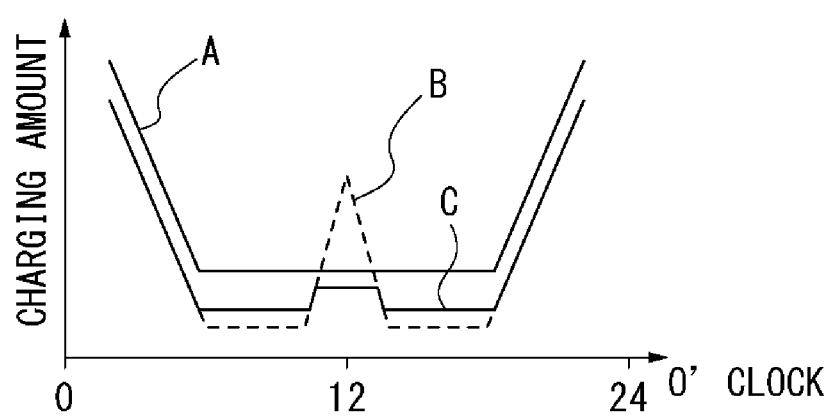
FIG. 2 represents graphs for indicating a concept of a charging amount control for EVs.

FIG. 2 represents the graphs for indicating the concept of the charging amount control for the EV. Referring to FIG. 2, the charging schedule managed by the EV management center 30 will be explained.

The graphs in FIG. 2 include a first graph (A), a second graph (B), and a third graph (C). In each of the first graph (A) to the third graph (C), the horizontal axis represents time passage of the day, and the vertical axis represents an amount of electric power used for charging the EV 90.

The first graph (A) represents a total amount of electric power allowed to use for charging the EV 90 in the smart community 10 at each time zone. The total amount is determined by the center management system 20 and is indicated to the EV management center 30. The second graph (B) represents an expected total amount of electric power to be used for charging the EV 90 group in the smart community 10 at each time zone. The expected total amount is calculated by the EV management center 30 based on past records, future predictions and so on. The third graph (C) represents the charging schedule created by controlling the expectation indicated by the second graph (B) so as to keep the total amount within an allowable range indicated by the first graph (A). That is, the third graph (C) represents a total amount of electric power practically allowed for charging the EV 90 group in the smart community 10 at each time zone.

In the example shown in the graph of FIG. 2, as seen from the first graph (A), regarding the amount of suppliable electric power, there is a margin in the early morning and the night. On the other hand, there is small margin during the day. Also, as seen from the second graph (B), the expected charge amount is concentrated in the early morning, around noon, and in the night. Suppliable amount of electric power is expected to be enough for the early morning and the night, but it is expected to be insufficient around noon. Therefore, as seen from the third graph (C), the electric power for charging that would be required around noon is distributed to time zones of morning and afternoon at which there is a margin in the electric power supply. According to the charging schedule created in this way, a driver of the EV 90 performs the charge of the rechargeable battery 91 in a planned manner. Thereby, it is possible that the electric power consumption in the smart community 10 is optimized, or it is possible that the electric power consumption in the smart community 10 is in a state similar to the optimum state.

More specifically, drivers of all the EVs 90 which are managed by the EV management center 30 register requests for future charging in that day or in the following day using, for example, an information terminal connected to the Internet. The EV management center 30 creates the charging schedule by appropriately adjusting the requests for future charging registered by each driver such that the adjusted requests are below a charge instruction amount required from the center management system 20 at all the time zones.

Thereafter, the created charging schedule is notified each driver via the information terminal and so on. When the driver starts the charge of the EV 90, if its charging operation has not been registered in the charging schedule, a message requesting to stop charging is transmitted to the on-board unit 100 of the EV 90. This message may be transmitted to the information terminal.

Figure 3:
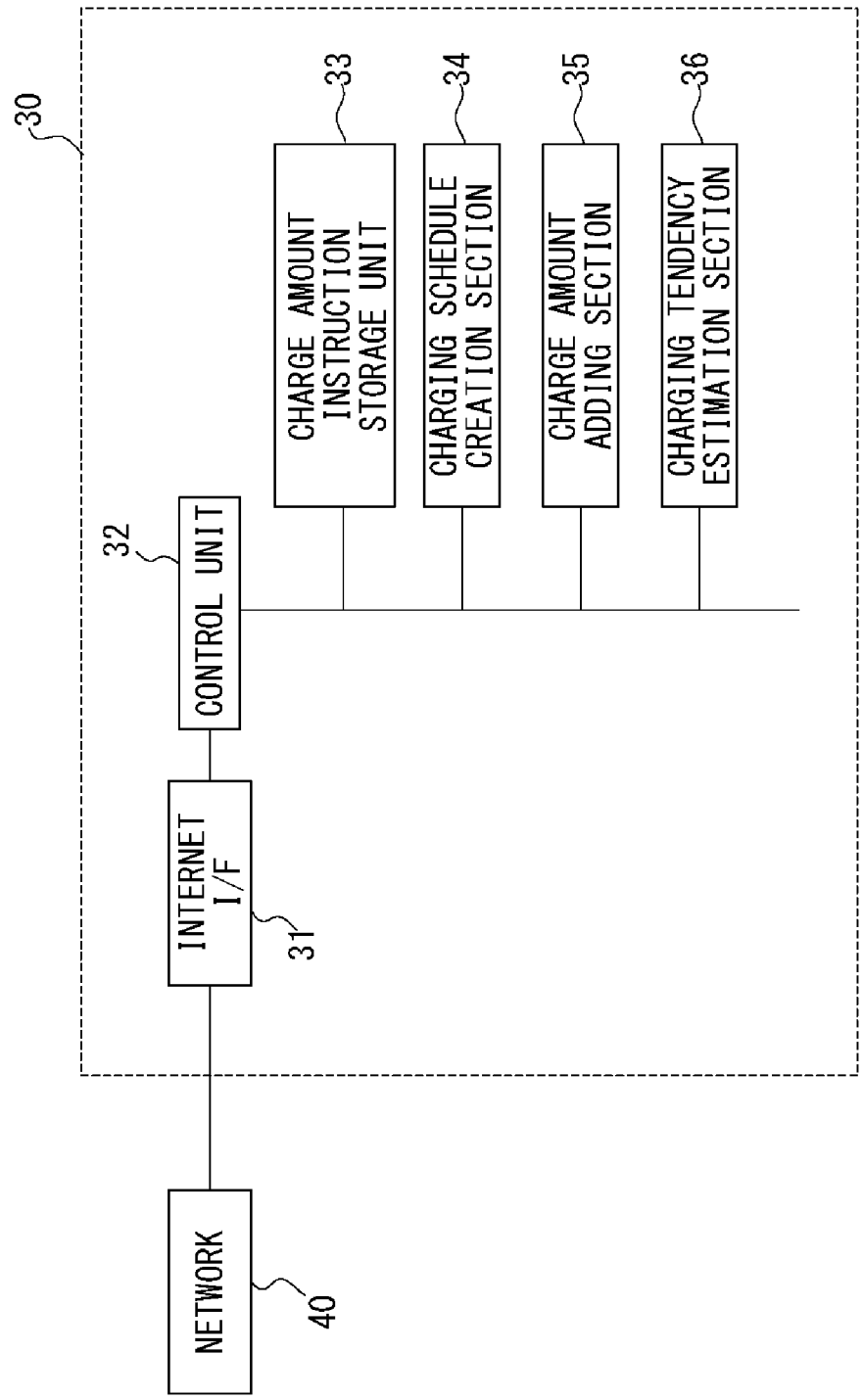
FIG. 3 is a block diagram for indicating a configuration example of an EV management center.

FIG. 3 is the block diagram for indicating the configuration example of the EV management center 30. Components of the EV management center 30 shown in FIG. 3 will be explained. The EV management center 30 includes an internet I/F (InterFace) 31, a control unit 32, a charge amount instruction storage unit 33, a charging schedule creation section 34, a charge amount adding section 35, and a charging tendency estimation section 36.

Connection relationships of the components of the EV management center 30 shown in FIG. 3 will be explained. The internet I/F 31 is connected to the network 40 and the control unit 32. The control unit 32 is connected to the internet I/F 31, the charge amount instruction storage unit 33, the charging schedule creation section 34, the charge amount adding section 35 and the charging tendency estimation section 36. The charge amount instruction storage unit 33 is connected to the control unit 32, the charging schedule creation section 34, the charge amount adding section 35 and the charging tendency estimation section 36. The charging schedule creation section 34 is connected to the control unit 32, the charge amount instruction storage unit 33, the charge amount adding section 35 and the charging tendency estimation section 36. The charge amount adding section 35 is connected to the control unit 32, the charge amount instruction storage unit 33, the charging schedule creation section 34 and the charging tendency estimation section 36. The charging tendency estimation section 36 is connected to the control unit 32, the charge amount instruction storage unit 33, the charging schedule creation section 34 and the charge amount adding section 35.

Operation of the components of the EV management center 30 shown in FIG. 3 will be explained. The internet I/F 31 relays a signal transmitted from the control unit 32 and a signal received by the control unit 32 via the network 40. The charge amount instruction storage unit 33 stores the data about the charge amount that has been instructed from the center management system 20. The charge amount adding section 35 calculates a requested charge amount by adding the charge request registered by each driver for each time zone. The charging tendency estimation section 36 estimates a predicted charge amount under the consideration of past data about actual charge amount and future relating data which can give an influence on fluctuations in a charging action such as weather forecasts as well as the requested charge amount which has been calculated. The charging schedule creation section 34 creates the charging schedule based on the charge instruction amount stored in the charge amount instruction storage unit 33 and the predicted charge amount estimated by the charging tendency estimation section 36. Note that it is preferable that operations performed by the charge amount instruction storage unit 33, the charge amount adding section 35, the charging tendency estimation section 36 and the charging schedule creation section 34 are carried out under the control of the control unit 32. The control unit 32 also performs communication with the on-board unit 100, the dedicated charging facility 70, other information terminals not shown etc.

FIG. 4A is the block diagram for indicating the configuration example of the on-board unit 100 according to the first embodiment. Components of the on-board unit 100 shown in FIG. 4A will be explained.

The on-board unit 100 shown in FIG. 4A includes a power supply unit 110, a bus 120, input and output unit 130, an arithmetic unit 140, a storage unit 150, and a GPS unit 160 serving as a current location detection unit. The input and output unit 130 includes a wireless communication circuit 131, a display unit 132, an ACC (ACCessory) signal input unit, IGCT (Ignition) signal input unit, and a charge start signal input unit. Note that the input and output unit 130 may not necessarily include all of the ACC signal input unit, the IGCT signal input unit and the charge start signal input unit.

Connection relationships of the components of the on-board unit 100 shown in FIG. 4A will be explained. The power unit 110 is connected to the input and output unit 130, the arithmetic unit 140, the storage unit 150 and the GPS unit 160. The bus 120 is connected to the input and output unit 130, the arithmetic unit 140, the storage unit 150 and the GPS unit 160.

Operations of the components of the on-board unit 100 shown in FIG. 4A will be explained. The electric power is inputted in the power unit 110 from a battery not shown of the EV 90 or the rechargeable battery 91. The power unit 110 generates a stable electric power if necessary and outputs it to each circuit. Operation signals outputted from the EV 90, more specifically, an ACC signal, an IGCT signal, a charging start signal and so on are inputted in the input and output unit 130, and the input and output unit 130 transmits these signals to each circuit via the bus 120. The GPS unit 160 receives wireless communication signals from the GPS satellite group 60, detects the current location of the EV 90 and on-board unit 100 and transmits it to each circuit via the bus 120. The wireless communication circuit 131 communicates with the EV management center 30 and so on via the mobile phone network 50 and the network 40. The display unit 132 displays the message and so on relating to mainly propriety of the charging operation to the driver of the EV 90. This message is generally visual information, but it may contain auditory information such as voice. In this case, the display unit 132 may include an audio output device. The arithmetic unit 140 controls each circuit mentioned above, and also performs other necessary calculations. The storage unit 150 stores an identification number of the on-board unit 100. The storage unit 150 may further readably store a program to be executed by the arithmetic unit 140.

In addition, it is preferable that this message is notified the driver using the information terminal such as mobile phone and smart phone registered in advance. In this case, the communication with the information terminal may be performed via the wireless communication signal from the on-board unit 100, may be performed via the mobile phone network 50, or may be performed from the EV management center via the network 40 and the mobile phone network 50.

FIG. 4B is the sequential diagram for indicating the operational example of the EV management system according to the first embodiment. The sequential diagram shown in FIG. 4B indicates operations executed by the charging circuit 92, the on-board unit 100 and the EV management center 30, respectively, and signals sent to or received from each other at that time. These operations will be explained as the first step S101 to the fourth step S104.

At first, in the first step S101, charging of the rechargeable battery 91 by the charging circuit 92 is initiated. Here, explanation will be made for the case in which this charge is performed by the home charging facility 80, but this charge may be performed by the dedicated charging facility 70. At this time, the on-board unit 100 detects the charging start signal indicating that the charging has started.

The charging start signal may be substituted by, for example, an operation result of combining a state of the ACC signal and a state of the IGCT signal. That is, when the IGCT signal becomes on-state while the ACC signal is off-state, it is possible to determine that the charging has started.

As another example, the charging start signal may be obtained via a CAN (Controller Area Network) bus of the EV 90. In this case, it is necessary that the input and output unit 130 of the on-board unit 100 is connected to the CAN bus. In addition, it is preferable that the input and output unit 130 is connected to the CAN bus via a safety device such as a so-called CAN gateway so as not to output undesirable signals to the CAN bus.

As yet another example, the charging start signal may be obtained via an OBD2 (On Board Diagnosis 2) bus of the EV 90.

Following the first step S101, the second step S102 is executed.

In the second step S102, when the on-board unit 100 detects the start of charging, the on-board unit 100 notifies the EV management center 30 of it. At this time, more specifically, the identification number of the on-board unit 100, the detected current location and the charging start signal are transmitted towards the EV management center 30 from the on-board unit 100. Furthermore, at this time, a remaining amount of the battery 91 may also be transmitted towards the EV management center 30. Following the second step S102, the third step S103 is executed.

In the third step S103, the EV management center 30 checks whether or not the charging operation correlated with a combination of the transmitted identification number, the transmitted current location and a current time is registered in the charging schedule. More specifically, firstly, the EV management center 30 checks that the EV 90 is a managed object by the EV management center 30 based on the transmitted identification number, and secondly, the EV management center 30 checks that the EV 90 is located in a range of the smart community 10 based on the transmitted current location. After that, the EV management center 30 checks whether or not the charging of the EV 90 at the current time is registered in the charging schedule.

As a result of the check, especially when the corresponding charging operation is not registered in the charging schedule, the check result is notified towards the on-board unit 100 from the EV management center 30. Following the third step S103, the fourth step S104 is performed.

In the fourth step S104, the on-board unit 100 displays the check result notified from the EV management center 30 on the display unit 132. In particular, if an initiated charging is not registered in the charging schedule, the display unit 132 displays the message such as "stop charging".

The EV management center 30 according to the first embodiment is operated in this way, and thereby it notifies the driver of the EV 90 of the charging operation which has not been registered in the charging schedule. It is expected that the driver who has received such a notification immediately stops charging. As a result, it is possible to suppress the charge amount in the smart community 10.

Second Embodiment

Figure 5A:
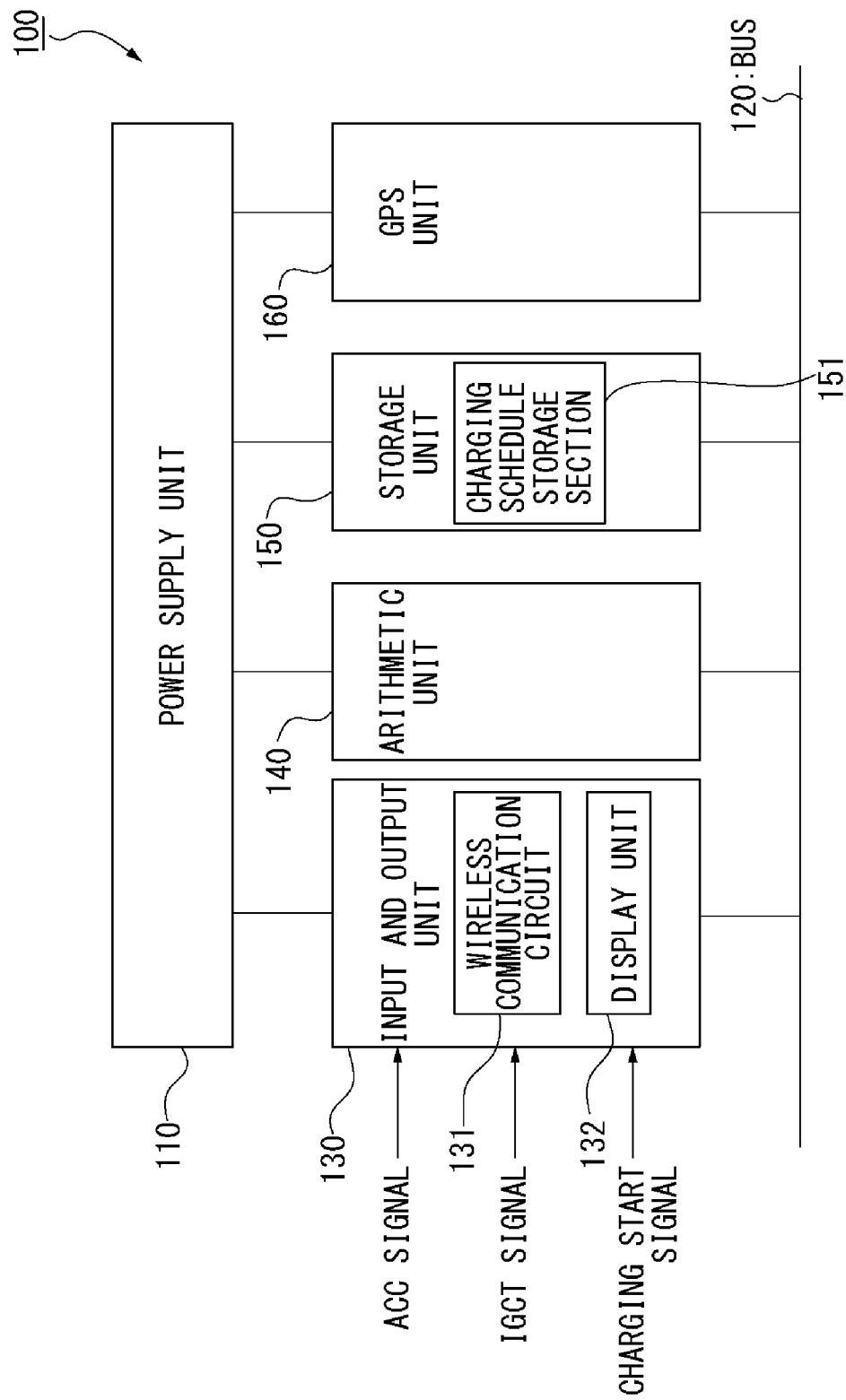
FIG. 5A is a block diagram for indicating a configuration example of the on-board unit according to a second embodiment.

FIG. 5A is the block diagram for indicating the configuration example of the on-board unit 100 according to the second embodiment. The on-board unit 100 shown in FIG. 5A is the same as the on-board unit 100 according to the first embodiment shown in FIG. 4A with the following modifications. That is, in the storage unit 150, a charging schedule storage section 151 is provided.

Because other configurations of the on-board unit 100 according to the second embodiment shown in FIG. 5A is the same as those in the first embodiment shown in FIG. 4A, a more detailed description is omitted.

The charging schedule storage section 151 included in the on-board unit 100 according to the second embodiment shown in FIG. 5A stores the charging schedule which is transmitted from the EV management center 30 as described later. Because other operations of the components of the on-board unit 100 according to the second embodiment shown in FIG. 5A is the same as those in the first embodiment shown in FIG. 4A, a more detailed description is omitted.

Figure 5B:
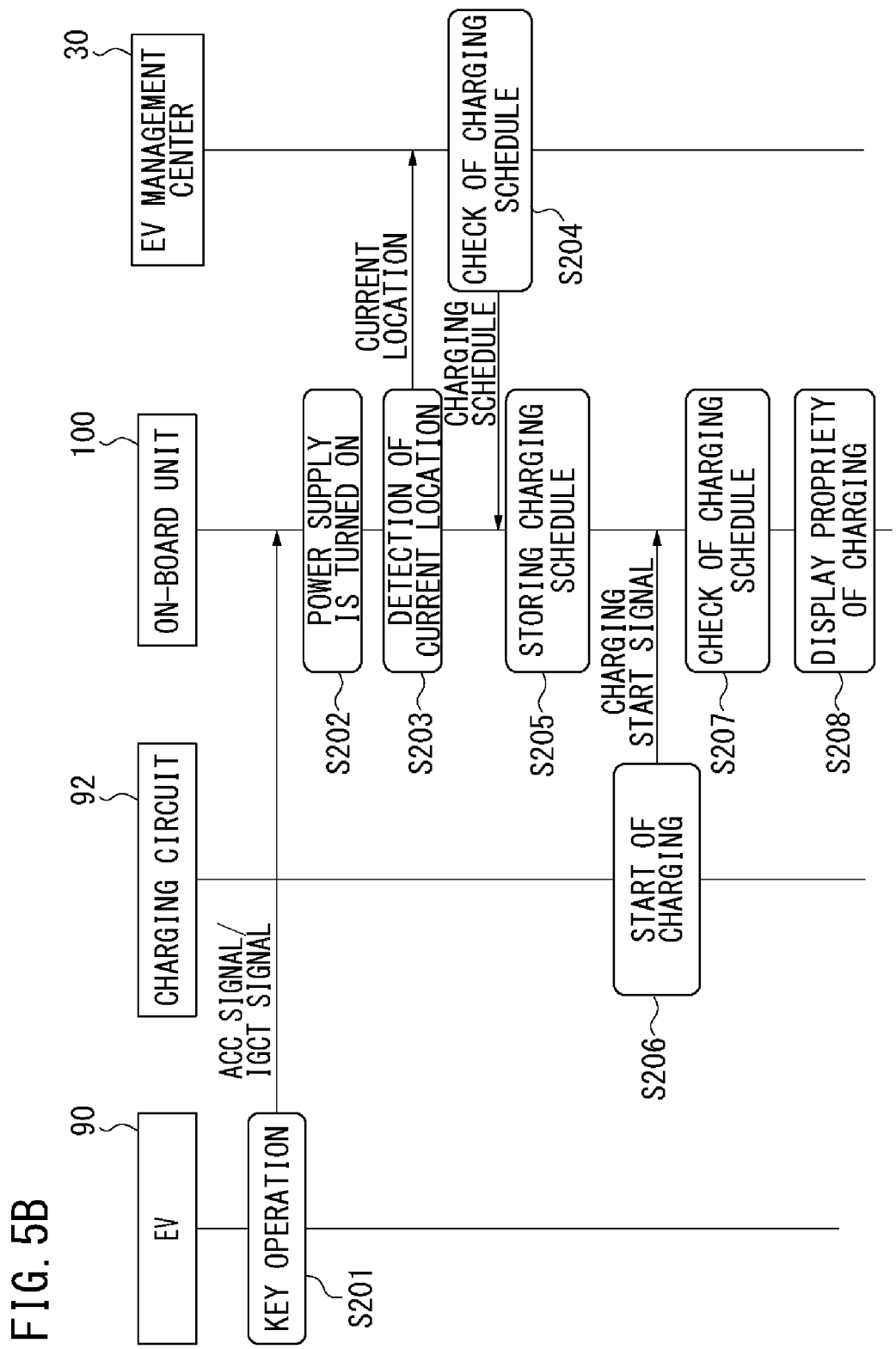
FIG. 5B is a sequential diagram for indicating an operational example of the EV management system according to the second embodiment.

FIG. 5B is the sequential diagram for indicating the operational example of the EV management system according to the second embodiment. The sequential diagram shown in FIG. 5B indicates operations executed by the EV 90, the charging circuit 92, the on-board unit 100 and the EV management center 30, respectively, and signals sent to or received from each other at that time. These operations will be explained as the first step S201 to the eighth step S208.

At First, in the first step S201, key operation is performed for the EV 90. That is, as the driver operates a key of the EV 90, the EV 90 makes the ACC signal or the IGCT signal on-state. The ACC signal or the IGCT signal is detected by on-board unit 100. Following the first step S201, the second step S202 is executed.

In the second step S202, when the ACC signal or the IGCT signal becomes on-state, the power supply of the on-board unit 100 which has detected the signal is turned on, and in particular, the arithmetic unit 140 starts to operate. Following the second step S202, the third step S203 is executed.

In the third step S203, the arithmetic unit 140 which have started to operate detects the current location using the GPS unit 160, and transmits the detected current location to the EV management center 30 via the wireless communication circuit 131. At this time, it is preferable that the identification number of the on-board unit 100 stored in the storage unit 150 is also transmitted to the EV management center 30. Following the third step S203, the fourth step S204 is performed.

In the fourth step S204, when the EV management center 30 receives the current location and the identification number transmitted from the on-board unit 100, the EV management center 30 checks the latest charging schedule in response to these received signals, and notifies the on-board unit 100 of contents of the latest charging schedule. Following the fourth step S204, the fifth step S205 is executed.

In the fifth step S205, the on-board unit 100 stores the latest charging schedule received from the EV management center 30 in the charging schedule storage section 151.

Note that every time the first step S201 is executed, that is, every time the ACC signal or the IGCT signal becomes on-state, the second step S202 to the fifth step S205 are executed, and the latest charging schedule is stored in the on-board unit 100.

Thereafter, charging of the rechargeable battery 91 by the charging circuit 92 is initiated at an arbitrary timing, namely the sixth step S206 is executed. Here, explanation will be made for the case in which this charge is performed by the home charging equipment 80, but this charge may be performed by the dedicated charging facility 70.

In the sixth step S206, as in the first step S201 in the first embodiment, when the charging of the rechargeable battery 91 by the charging circuit 92 starts, the on-board unit 100 detects the charging start signal indicating that the charging has started. Following the sixth step S206, the seventh step S207 is executed.

In the seventh step S207, when the on-board unit 100 detects the start of charging, the arithmetic unit 140 checks whether or not the charging operation correlated with a combination of the identification number, the current location and the current time is registered in the charging schedule read out from the charging schedule storage section 151. Following the seventh step S207, the eighth step S208 is executed.

In the eighth step S208, the on-board unit 100 displays on the display unit 132 a result of the check which has been performed in the seventh step S207, that is, whether or not the charge is allowed. In particular, if the initiated charging is not registered in the charging schedule, the display unit 132 displays the message such as "stop charging".

The EV management center 30 according to the second embodiment is operated in this way, and thereby the driver of the EV 90 is notified of the charging operation which has not been registered in the charging schedule. It is expected that the driver who has received such a notification immediately stops charging. As a result, it is possible to suppress the charge amount in the smart community 10.

Particularly, in the case of the second embodiment, during a time between detection of the charging start signal by the on-board unit 100 and displaying the message on the display unit 132, it is not necessary to perform a query to the EV management center 30. Therefore, it is possible to reduce time of an improper charging operation as much as possible.

Third Embodiment

Configurations of the on-board unit 100 used in the third embodiment is the same as those in the first embodiment shown in FIG. 4A. Therefore, a more detailed description is omitted.

Figure 6:
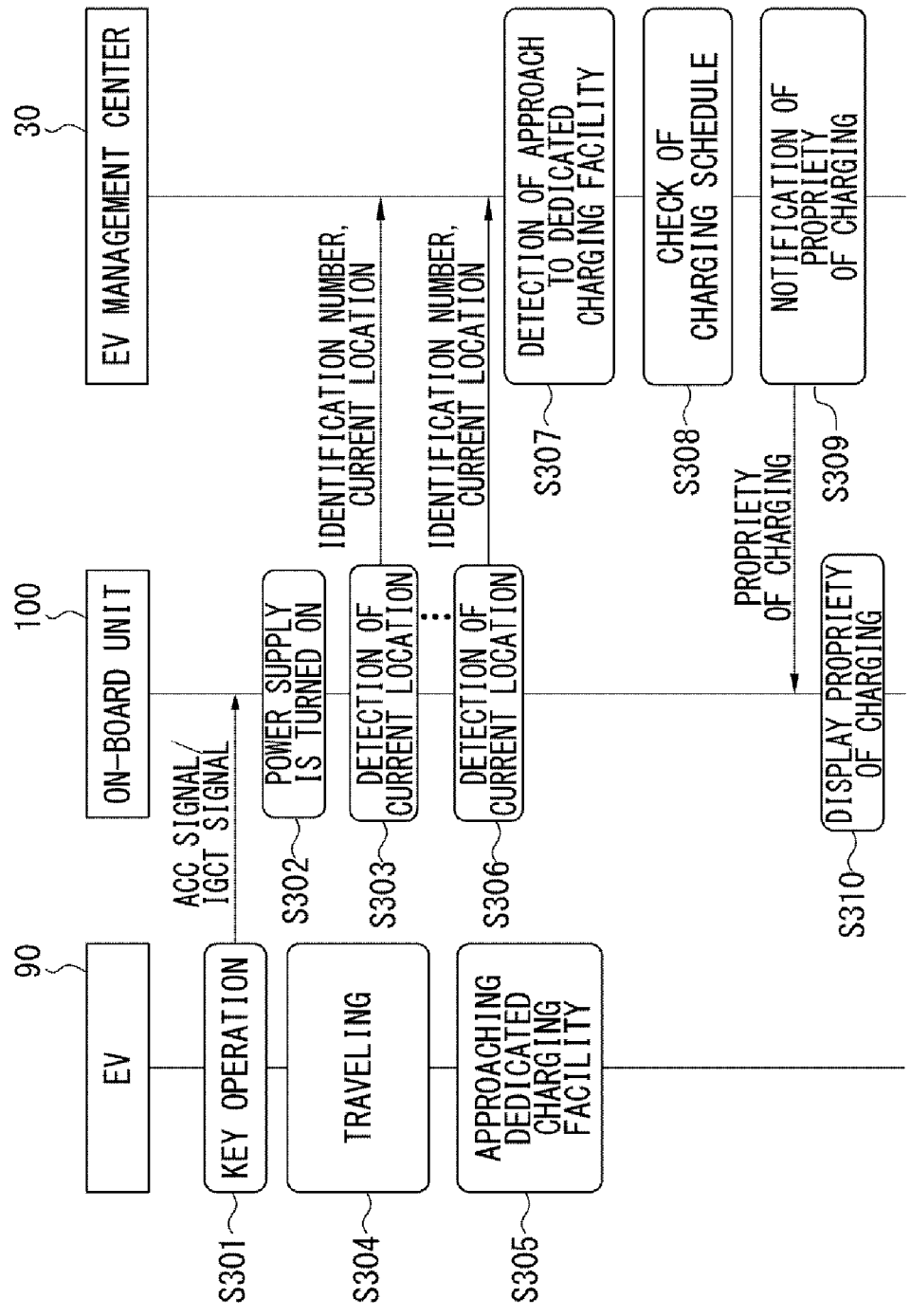
FIG. 6 is a sequential diagram for indicating an operational example of the EV management system according to a third embodiment.

FIG. 6 is the sequential diagram for indicating the operational example of the EV management system according to the third embodiment. The sequential diagram shown in FIG. 6 indicates operations executed by the EV 90, the on-board unit 100 and the EV management center 30, respectively, and signals sent to or received from each other at that time. These operations will be explained as the first step S301 to the tenth step S310.

At first, in the first step S301, the key operation is performed for the EV 90. That is, as the driver operates the key of the EV 90, the EV 90 makes the ACC signal or the IGCT signal on-state. The ACC signal or the IGCT signal is detected by on-board unit 100. Following the first step S301, the second step S302 is executed.

In the second step S302, when the ACC signal or the IGCT signal becomes on-state, the power supply of the on-board unit 100 which has detected the signal is turned on, and in particular, the arithmetic unit 140 starts to operate. Following the second step S302, the third step S303 is executed.

In the third step S303, the arithmetic unit 140 detects the current location using the GPS unit 160, and transmits the detected current location to the EV management center 30 via the wireless communication circuit 131. At this time, it is preferable that the identification number of the on-board unit 100 stored in the storage unit 150 is also transmitted to the EV management center 30.

After the first step S301, in parallel with the second step S302 and the third step S303, the EV 90 travels, namely the fourth step S304 is executed. Here, explanation will be made for the case in which the EV travels within a range of the smart community 10, but the EV may travel without its range.

Note that, during the execution of the fourth step S304, namely, during the traveling of the EV 90, the on-board unit 100 repeats the detection of the current location using the GPS unit 160, and the on-board unit 100 repeats the transmission of the detected result to the EV management center 30.

Then, during the execution of the fourth step S304, that is, during the traveling of the EV 90, if the driver feels necessity of charging as the remaining amount of charging decreases, the EV 90 approaches the dedicated charging facility 70, namely the fifth step S305 is executed.

In the fifth step S305, even while the EV90 approaches the dedicated charging facility 70, the on-board unit 100 is repeating the detection of the current location using the GPS unit 160, and the on-board unit 100 is repeating the transmission of the detected result to the EV management center 30, namely the sixth step S306 is executed. Following the sixth step S306, the seventh step S307 is executed.

In the seventh step S307, as the EV management center 30 has stored in advance locations of the dedicated charging facilities 70, the EV management center 30 detects that the current location received from the on-board unit 100 is sufficiently close to any of the dedicated charging facilities 70. Judgement criteria of this detection may be based on a distance from the current location of the EV 90 to the dedicated charging facility 70, or speed of the EV 90 estimated based on the current locations received consecutively may be taken into consideration. In any case, the EV management center 30 judges that the EV 90 that is sufficiently close to the dedicated charging facility 70 is trying to charge the rechargeable battery 91. Following the seventh step S307, the eighth step S308 is executed.

In the eighth step S308, as in the third step S103 in the first embodiment, the EV management center 30 checks whether or not the charging operation correlated with the combination of the transmitted identification number, the transmitted current location and the current time is registered in the charging schedule. Following the eighth step S308, the ninth step S309 is executed.

In the ninth step S309, the EV management center 30 notifies the on-board unit 100 of the result of the check which has been performed in the eighth step S308. Following the ninth step S309, the tenth step S310 is executed.

In the tenth step S310, the on-board unit 100 displays the check result notified from the EV management center 30 on the display unit 132. In particular, when the EV 90 is not registered in the charging schedule of the dedicated charging facility 70 which the EV 90 is currently approaching, the display unit 132 displays the message such as "stop charging".

The EV management center 30 according to the third embodiment is operated in this way, and thereby it is possible to display the message relating to whether or not the charging operation is allowed on the display unit 132 of the on-board unit 100 before charging the rechargeable battery 91 of the EV 90. As a result, it is possible to prevent the improper charging before the start of charging.

Fourth Embodiment

Configurations of the on-board unit 100 used in the fourth embodiment is the same as those in the first embodiment shown in FIG. 4A. Therefore, a more detailed description is omitted.

Figure 7:
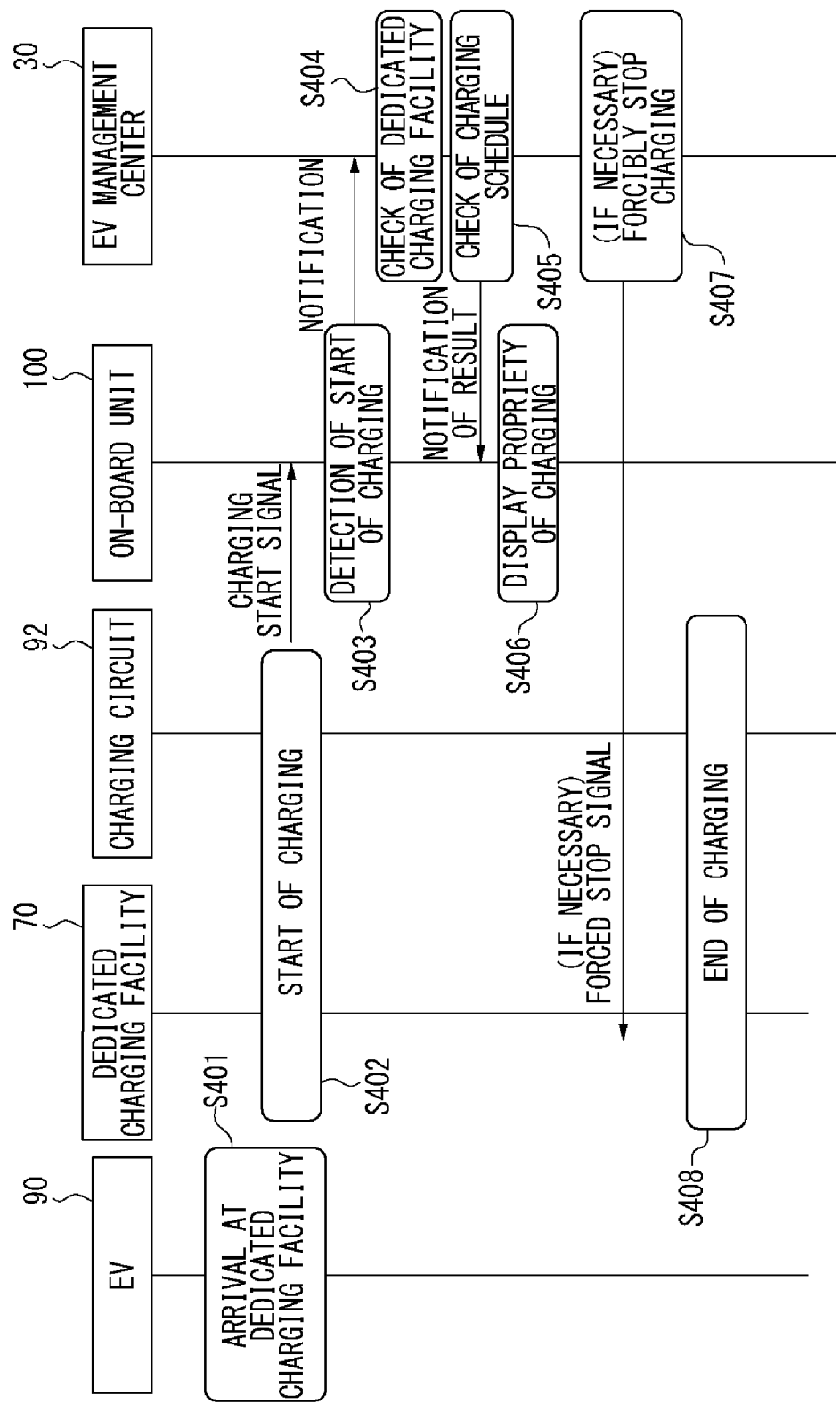
FIG. 7 is a sequential diagram for indicating an operational example of the EV management system according to a fourth embodiment.

FIG. 7 is the sequential diagram for indicating the operational example of the EV management system according to the fourth embodiment. The sequential diagram shown in FIG. 7 indicates operations executed by the EV 90, the dedicated charging facility 70, the charging circuit 92, the on-board unit 100 and the EV management center 30, respectively, and signals sent to or received from each other at that time. These operations will be explained as the first step S401 to the eighth step S408.

At first, in the first step S401, the EV 90 arrives at the dedicated charging facility 70. Then, in the second step S402, the charging of the rechargeable battery 91 from the dedicated charging facility 70 via the charging circuit 92 is initiated. At this time, as in the first step S101 in the first embodiment, the on-board unit 100 detects the charging start signal which indicates that the charging has started. Following the second step S402, the third step S403 is executed.

In the third step S403, when the on-board unit 100 detects the start of charging, the on-board unit 100 notifies the EV management center 30 of it as in the second step S102 in the first embodiment. Following the third step S403, the fourth step S404 is executed.

In the fourth step S404, the EV management center 30 judges that the EV 90 exists in the dedicated charging facility 70 by comparing the current location transmitted from the on-board unit 100 with the location of the dedicated charging equipment 70 stored in advance. Following the fourth step S404, the fifth step S405 is executed.

In the fifth step S405, as in the third step S103 in the first embodiment, the EV management center 30 checks whether or not the charging operation correlated with the combination of the transmitted identification number, the transmitted current location and the current time is registered in the charging schedule, and notifies the on-board unit 100 of the result. Following the fifth step S405, the sixth step S406 and the seventh step S407 are executed.

In the sixth step S406, as in the fourth step S104 in the first embodiment, the on-board unit 100 displays the check result notified from the EV management center 30 on the display unit 132.

In the seventh step S407, the EV management center 30 can forcibly stop the charging in the dedicated charging facility 70, if necessary, that is, if the driver does not voluntarily stop charging etc. as well as the charging is not registered in the charging schedule. In this case, the EV management center 30 may transmit a forced stop signal to the dedicated charging facility 70 via, for example, the network 40. Following the seventh step S407, the eighth step S408 is executed.

In the eighth step S408, the dedicated charging facility 70 which has received the forced stop signal stop supplying the electric power. Thereby, the charging of the rechargeable battery 91 by the charging circuit 92 has come to end.

The EV management system according to the fourth embodiment is operated in this way, and thereby it notifies the driver of the EV 90 of the charging operation which has not been registered in the charging schedule. It is expected that the driver who has received such a notification immediately stops charging. In the case in which the charging is not stopped, it is possible that the EV management center 30 forcibly stops charging by remotely operating the dedicated charging facility 70. As a result, it is possible to suppress the charge amount in the smart community 10 more securely.

Although the invention made by the inventors has been concretely described based on the embodiments, the present invention is not limited to the above-mentioned embodiments and can be variously modified without departing from the spirit or scope of the general inventive concept thereof. In addition, it is possible to freely combine the features explained in embodiments as long as the technical contradiction does not occur.

This application claims a priority based on Japan Patent Application No. JP 2013-036242. The disclosure of which is hereby incorporated by reference herein in its entirety.

The invention claimed is:

1. An on-board unit mounted on an electric vehicle which travels using an externally rechargeable battery comprising:
   a current location detecting unit configured to detect a current location of the electric vehicle;
   a wireless communication unit configured to communicate with a server managing a charging schedule via a wireless communication network, the server provided on an external network;
   a display unit configured to display whether or not a charging operation is allowed at the current location at a current time based on the charging schedule;
   a storage unit configured to store an identification number of the on-board unit in advance;
   an input unit configured to detect a start of charging of the rechargeable battery; and
   an arithmetic unit configured to transmit the current location and the identification number to the server via the wireless communication unit when the start of charging is detected, receive a result of checking the charging schedule by the server via the wireless communication unit, and transmit the result to the display unit.

2. An on-board unit mounted on an electric vehicle which travels using an externally rechargeable battery comprising:
   a current location detecting unit configured to detect a current location of the electric vehicle;
   a wireless communication unit configured to communicate with a server managing a charging schedule via a wireless communication network, the server provided on an external network;
   a display unit configured to display whether or not a charging operation is allowed at the current location at a current time based on the charging schedule;
   a power unit configured to turn on a power supply in response to an operation signal transmitted from the electric vehicle;
   an arithmetic unit configured to transmit the detected current location to the server via the wireless communication unit every time the power supply is turned on, and receive the charging schedule transmitted from the server via the wireless communication unit;

a storage unit configured to store an identification number of the on-board unit in advance and the received charging schedule; and an input unit configured to detect a start of charging of the rechargeable battery, wherein the arithmetic unit is configured to judge whether or not the charging operation correlated with a combination of the current location, the identification number and the current time is allowed based on the stored charging schedule in response to detection of the start of charging, and transmit a result of the judgement to the display unit.

3. The on-board unit according to claim 2, wherein the operation signal is an ACC (ACCessory) signal or an IGCT (Ignition) signal.

4. An on-board unit mounted on an electric vehicle which travels using an externally rechargeable battery comprising:
a current location detecting unit configured to detect a current location of the electric vehicle;
a wireless communication unit configured to communicate with a server managing a charging schedule via a wireless communication network, the server provided on an external network;
a display unit configured to display whether or not a charging operation is allowed at the current location at a current time based on the charging schedule;
a storage unit configured to store an identification number of the on-board unit in advance;
a power unit configured to turn on a power supply in response to an operation signal transmitted from the electric vehicle; and
an arithmetic unit configured to repeatedly order the current location detecting unit to detect the current location, repeatedly transmit the identification number and the current location to the server via the wireless communication unit, receive a check result of the charging schedule transmitted from the server via the wireless communication unit when the electric vehicle approaches a dedicated charging facility, and transmit the check result to the display unit.

5. An electric vehicle management system comprising:
an electric vehicle management center provided on a network and configured to manage a charging schedule; and
an on-board unit mounted on an electric vehicle which travels using an externally rechargeable battery and configured to communicate with the electric vehicle management center via a wireless communication network, the on-board unit comprising
a current location detecting unit configured to detect a current location of the electric vehicle;
a display unit configured to display whether or not a charging operation is allowed at the current location at a current time based on the charging schedule;
a storage unit configured to store an identification number of the on-board unit in advance;
an input unit configured to detect a start of charging of the rechargeable battery; and
an arithmetic unit configured to transmit the current location and the identification number to the electric vehicle management center via a wireless communication unit of the on-board unit when the start of charging is detected, wherein the electric vehicle management center comprises a control unit configured to check whether or not charge allowance correlated with a combination of the transmitted current location, the transmitted identification number and the current time is registered in the charging schedule, and transmit a check result to the on-board unit, and
wherein the arithmetic unit is configured to receive the check result from the electric vehicle management system via the wireless communication unit, and transmit the check result to the display unit.

6. The electric vehicle management system according to claim 5, further comprising:
a dedicated charging facility connected to the network and which is capable of charging the rechargeable battery,
wherein the control unit is configured to detect that the electric vehicle exists in the dedicated charging facility based on the transmitted current location, and forcibly stop charging in the dedicated charging facility when the charging operation correlated with the combination is not allowed.

7. An electric vehicle management system comprising:
an electric vehicle management center provided on a network and configured to manage a charging schedule; and
an on-board unit mounted on an electric vehicle which travels using an externally rechargeable battery and configured to communicate with the electric vehicle management center via a wireless communication network, the on-board unit comprising
a current location detecting unit configured to detect a current location of the electric vehicle;
a display unit configured to display whether or not a charging operation is allowed at the current location at a current time based on the charging schedule;
a power unit configured to turn on a power supply in response to an operation signal transmitted from the electric vehicle; and
an arithmetic unit configured to transmit the detected current location to the electric vehicle management center via a wireless communication unit of the on-board unit every time the power supply is turned on, wherein the electric vehicle management center comprises a control unit configured to transmit the charging schedule correlated with the transmitted current location to the on-board unit,
wherein the on-board unit further comprises:
a storage unit configured to store an identification number of the on-board unit and the transmitted charging schedule; and
an input unit configured to detect a start of charging of the rechargeable battery, and
wherein the arithmetic unit is configured to judge whether or not the charging operation correlated with a combination of the current location, the identification number and the current time is allowed based on the stored charging schedule in response to detection of the start of charging, and transmit a result of the judgement to the display unit.

8. The electric vehicle management system according to claim 7, wherein the operation signal is an ACC (ACCessory) signal or an IGCT (Ignition) signal.

9. An electric vehicle management system comprising:
an electric vehicle management center provided on a network and configured to manage a charging schedule;

an on-board unit mounted on an electric vehicle which travels using an externally rechargeable battery and configured to communicate with the electric vehicle management center via the wireless communication network, the on-board unit comprising a current location detecting unit configured to detect a current location of the electric vehicle, and a display unit configured to display whether or not a charging operation is allowed at the current location at a current time based on the charging schedule; and a dedicated charging facility connected to the network and which is capable of charging the rechargeable battery, wherein the on-board unit further comprises:
- a storage unit configured to store an identification number of the on-board unit in advance;
- a power unit configured to turn on a power supply in response to an operation signal transmitted from the electric vehicle; and
- an arithmetic unit configured to repeatedly order the current location detecting unit to detect the current location, and repeatedly transmit the identification number and the current location to the electric vehicle management center via a wireless communication unit of the on-board unit;

wherein the electric vehicle management center comprises a control unit configured to detect approach of the electric vehicle to the dedicated charging facility based on the transmitted current location, check whether or not the charging operation correlated with a combination of the transmitted current location, the transmitted identification number and the current time is allowed based on the charging schedule, and transmit a check result to the on-board unit, and wherein the arithmetic unit is configured to transmit the check result to the display unit.

10. An electric vehicle management method comprising:
managing a charging schedule by an electric vehicle management center provided on a network;
detecting a current location by an on-board unit mounted on an electric vehicle which travels using an externally rechargeable battery;
communicating between the electric vehicle management center and the on-board unit via a wireless communication network;
displaying on the on-board unit whether or not a charging operation at the current location at a current time is allowed based on the charging schedule;
detecting a start of charging of the rechargeable battery by the on-board unit;
transmitting the current location and an identification number of the on-board unit from a wireless communication unit of the on-board unit to the electric vehicle management center when the start of charging is detected;
checking whether or not charge allowance correlated with a combination of the transmitted current location, the transmitted identification number and the current time is registered in the charging schedule;
transmitting a check result to the on-board unit;
receiving the check result by the on-board unit; and
transmitting the check result to a display unit.

11. The electric vehicle management method according to claim 10, further comprising:
starting charging the rechargeable battery in a dedicated charging facility connected to the network and which is capable of charging the rechargeable battery; and detecting that the electric vehicle exists in the dedicated charging facility based on the transmitted current location by the electric vehicle management center, and forcibly stopping the charging in the dedicated charging facility when the charging operation correlated with the combination is not allowed.

12. An electric vehicle management method comprising:
managing a charging schedule by an electric vehicle management center provided on a network;
detecting a current location by an on-board unit mounted on an electric vehicle which travels using an externally rechargeable battery;
communicating between the electric vehicle management center and the on-board unit via a wireless communication network;
displaying on the on-board unit whether or not a charging operation at the current location at a current time is allowed based on the charging schedule;
turning on a power supply of the on-board unit in response to an operation signal transmitted from the electric vehicle;
transmitting the detected current location from a wireless communication unit of the on-board unit to the electric vehicle management center every time the power supply is turned on;
transmitting the charging schedule correlated with the transmitted current location from the electric vehicle management center to the on-board unit;
storing the transmitted charging schedule in a storage unit;
detecting a start of charging of the rechargeable battery;
judging whether or not the charging operation correlated with a combination of the current location, an identification number of the on-board unit and the current time is allowed based on the stored charging schedule in response to the detection of the start of charging; and
transmitting a result of the judgement to a display unit.

13. The electric vehicle management method according to claim 12, wherein the operation signal is an ACC (ACCessory) signal or an IGCT (Ignition) signal.

14. An electric vehicle management method comprising:
managing a charging schedule by an electric vehicle management center provided on a network;
detecting a current location by an on-board unit mounted on an electric vehicle which travels using an externally rechargeable battery;
communicating between the electric vehicle management center and the on-board unit via a wireless communication network;
displaying on the on-board unit whether or not a charging operation at the current location at a current time is allowed based on the charging schedule;
turning on a power supply of the on-board unit in response to an operation signal transmitted from the electric vehicle;
repeating detecting the current location;
repeatedly transmitting an identification number of the on-board unit and the current location from a wireless communication unit of the on-board unit to the electric vehicle management center;
detecting approach of the electric vehicle to a dedicated charging facility based on the transmitted current location by the electric vehicle management center;
checking whether or not the charging operation correlated with a combination of the transmitted current location, the identification number and the current time is allowed based on the charging schedule;

transmitting a check result to the on-board unit; and
transmitting the check result to a display unit.

15. An electric vehicle management system comprising:
an electric vehicle management center provided on a network and configured to manage a charging schedule; and
an on-board unit mounted on an electric vehicle which travels using an externally rechargeable battery and configured to communicate with the electric vehicle management center via the wireless communication network, the on-board unit comprising
   a current location detecting unit configured to detect a current location of the electric vehicle,
   a display unit configured to display whether or not a charging operation is allowed at the current location at a current time based on the charging schedule,
   a storage unit configured to store an identification number of the on-board unit in advance,
   an input unit configured to detect a start of charging of the rechargeable battery, and
   an arithmetic unit configured to transmit the current location and the identification number to the electric vehicle management center via a wireless communication unit of the on-board unit when the start of charging is detected,
wherein the electric vehicle management center comprises
   a charging schedule creation unit configured to create the charging schedule in which an electric power consumption is optimized based on an amount of electric power available for charging the electric vehicle and an expected charge amount for charging the electric vehicle, and
   a control unit configured to check whether or not charge allowance correlated with a combination of the transmitted current location, the transmitted identification number and the current time is registered in the charging schedule, and transmit a check result to the on-board unit, and wherein the arithmetic unit is configured to receive the check result from the electric vehicle management system via the wireless communication unit, and transmit the check result to the display unit.

16. An electric vehicle management method comprising:
managing a charging schedule by an electric vehicle management center provided on a network;
detecting a current location by an on-board unit mounted on an electric vehicle which travels using an externally rechargeable battery;
communicating between the electric vehicle management center and the on-board unit via a wireless communication network;
displaying on the on-board unit whether or not a charging operation at the current location at a current time is allowed based on the charging schedule;
creating the charging schedule by the electric vehicle management center in which an electric power consumption is optimized based on an amount of electric power available for charging the electric vehicle and an expected charge amount for charging the electric vehicle;
detecting a start of charging of the rechargeable battery by the on-board unit;
transmitting the current location and an identification number of the on-board unit from a wireless communication unit of the on-board unit to the electric vehicle management center when the start of charging is detected;
checking by the electric vehicle management center whether or not charge allowance correlated with a combination of the transmitted current location, the transmitted identification number and the current time is registered in the charging schedule;
transmitting a check result to the on-board unit;
receiving the check result by the on-board unit; and
transmitting the check result to a display unit.

* * * * *